US007653381B2

(12) United States Patent
Bredikhin et al.

(10) Patent No.: US 7,653,381 B2
(45) Date of Patent: Jan. 26, 2010

(54) METHOD FOR INPUTTING AND SEARCHING INFORMATION ABOUT AN OBJECT IN A REMOTE DATABASE

(76) Inventors: Aleksandr Yurevich Bredikhin, Uglovoi Pereulok, bldg. 12, Klin (RU) 141601; Nikolai Evgenevich Sergeichev, Ulitza Gagarina, 7, apt. 2, Novospasskoye (RU) 433870

( * ) Notice: Subject to any disclaimer, the term of this patent is extended or adjusted under 35 U.S.C. 154(b) by 0 days.

(21) Appl. No.: 12/493,956

(22) Filed: Jun. 29, 2009

(65) Prior Publication Data
US 2009/0259640 A1 Oct. 15, 2009

Related U.S. Application Data

(63) Continuation-in-part of application No. PCT/RU2007/000295, filed on Jun. 4, 2007.

(30) Foreign Application Priority Data
Apr. 23, 2007 (RU) .............................. 2007115019

(51) Int. Cl.
*H04L 29/06* (2006.01)
*H04M 1/725* (2006.01)
*H04M 3/42* (2006.01)
*G06F 17/30* (2006.01)
*G06F 15/16* (2006.01)
*G06Q 30/00* (2006.01)

(52) U.S. Cl. ................. 455/414.3; 455/412.1; 455/466; 379/218.01; 707/3; 709/219; 705/14.67

(58) Field of Classification Search .............. 455/412.1, 455/412.2, 414.2, 414.3; 379/218.01, 93.12; 707/3, 6; 709/218, 219; 705/14.67
See application file for complete search history.

(56) References Cited

U.S. PATENT DOCUMENTS

| 5,764,736 | A * | 6/1998 | Shachar et al. ........... 379/93.09 |
| 7,027,801 | B1 * | 4/2006 | Hall et al. ................. 455/412.1 |
| 2004/0166832 | A1 * | 8/2004 | Portman et al. .......... 455/412.1 |
| 2005/0153717 | A1 * | 7/2005 | Hauglum ..................... 455/466 |
| 2005/0238159 | A1 * | 10/2005 | Halsell .................. 379/218.01 |
| 2006/0003754 | A1 | 1/2006 | Robison et al. |
| 2007/0219963 | A1 * | 9/2007 | Soroca .......................... 707/3 |
| 2008/0273680 | A1 | 11/2008 | Zohar et al. |

* cited by examiner

Primary Examiner—George Eng
Assistant Examiner—Un C Cho
(74) Attorney, Agent, or Firm—Bardmesser Law Group (57) ABSTRACT

A method includes transmitting an object ID containing message from a mobile communication terminal via the network of the Global System for Mobile Communications through a mobile network operator equipment and by means of the Internet network to a server. At least one word is used as an object ID containing message transmitted from a mobile communication terminal. When searching for an object ID in the database the server compares the word with domain names. If the user of a mobile communication terminal finds a matching domain name, the server transmits a subscriber's phone number to him. Then, the mobile communication terminal initiates connection to that phone number by making a voice call to the subscriber's phone number. The method enables to expand functional capabilities, speed up search, decrease volumes of information transmitted, reduce load on telecommunications networks and their equipment.

8 Claims, 4 Drawing Sheets

METHOD FOR INPUTTING AND SEARCHING INFORMATION ABOUT AN OBJECT IN A REMOTE DATABASE

CROSS-REFERENCE TO RELATED APPLICATIONS

This application is a continuation-in-part of PCT/RU2007/00295, filed on 4 Jun. 2007, which claims priority to Russian Patent Application No. 2007115019, filed on 23 Apr. 2007, which are incorporated by reference herein in their entirety.

FIELD OF THE INVENTION

This invention relates to radio engineering and may be used in searching for data in telecommunication network databases, thereby allowing for a significant extension of capabilities of mobile communication devices in dialing communication terminal subscriber numbers. A communication terminal subscriber number is a unique identifier that can positively identify a particular subscriber in a communication network.

DESCRIPTION OF THE RELATED ART

A method for interpreting object identifiers is known, see US Patent Publication No. 2002165801, published on Nov. 7, 2002. This method consists of analyzing a graphic presentation, e.g., a bar code characterizing an object, and of obtaining information on that object on the basis of the analyzed graphic presentation.

Disadvantages of this method are large volumes of data transmitted to a remote server, and obligatory use of an image scanning device in a system where this conventional method is implemented.

The use of domain names as identifiers is known in the field of operating global information networks for the purpose of facilitating the use of the Internet, see P. B. Khramtsov, "A Domain Name System," p. 245 (2004).

Every server on the Internet network has its own unique ID code (IP-address), which consists of 12 digits separated by dots into groups of three digits each. This unique code enables a browser used for viewing websites to find a needed resource, but such a code is hard to remember for a user, and, moreover, it does not characterize the contents of an Internet resource.

The DNS system (Domain Name Server system) is used to alleviate this problem. The DNS system enables associating a domain name, i.e., a letter/alphanumeric designation convenient for users, with every unique ID code.

While navigating through a plurality of designations, this system makes use of a nested name system, wherein the names are separated by dots.

For example, it would be difficult to define what a resource is at IP-address 213.243.106.84. But that resource has the designation, i.e., domain name, of www.sport.ru.

The "ru" portion means that the website is in the Runet (Russian area of the Internet) area, and that it most likely comprises Russian text; the "sport" portion informs a user that this website is devoted to sport subjects. Any Internet user, even an inexperienced one, who wants to get sports information, can enter this domain name in the search field of his/her browser and obtain the necessary information.

The system for allocating domain names has a disadvantage in that only one particular IP address can be matched to one unique letter designation.

A conventional method for entering and searching data on an object in a remote data base includes transmitting an object ID containing message from a mobile communication terminal via the network of the Global System for Mobile Communications through a mobile network operator and by means of the Internet network to a server, then receiving that object ID containing message by the server, searching the object ID in the server database, and, if found, transmitting a message on the location of the object ID over the Internet via the Global System for Mobile Communications (GSM) network through a mobile network operator. (See, e.g., RU Patent 2248040, published on Mar. 10, 2005).

This method is carried out by coding messages transmitted by mobile communication devices and formed with the use of the classified index published officially and distributed to the general public, where at least one Section is prepared with the possibility of determining the ID of the object individual distinctive feature. A sender of such an ID transmits a mobile communication message to a computer server having software used for converting such a message in a server database entry for the purpose of transmitting it by a mobile communication message to at least one user. Alternatively, it is possible to search for at least one entry in the server database that matches such a message, and transmit the same to the message sender by at least one mobile communication message from the server. This particular system is designed for organizing an online dating system with the use of mobile communication terminals.

The objective of the conventional method is to offer to users the possibility of fulfilling highly complex requests sent to a remote database and obtaining large volumes of data on search subjects with the use of mobile communication devices, including the possibility of satisfying demand and/or supply of goods and services in the market, irrespective of where and when such needs arise.

The shortcomings of the conventional method are:

1. When searching for data, it is necessary to enter a voluminous set of additional data (e.g., height, weight, sex, year of birth, occupation, etc.).

2. There is no possibility of searching for data by name, e.g., by goods type, by last name, by activities fulfilled, or by various features of an object. The system is not applicable for conducting searches according to any and/or variable parameters.

3. While implementing the method, it is necessary to precisely define a data set on which a search may be conducted; further, there is no possibility of conducting a search according to a parameter that is not set by the developers, e.g., by blood group, citizenship, residence, etc.

4. A large number of transmitted parameters is necessary for conducting a meaningful search, which results in overloading the server and the mobile operator equipment, as well as in difficulties in decoding of data and reduced speeds while transmitting data needed by a user through communication networks.

5. In order to use this method, it is necessary to have a published classified index.

6. The possibility of voice communications between subscribers may not be implemented in the conventional method, since all messages are transmitted from mobile communication terminals as SMS-messages (SMS—short message service of a mobile network operator). After receiving and processing incoming messages the server sends a message stating "Marina, 24/167/54, would like to date you" to a man, and "Theodore, 31/176/76, would like to date you" to a woman, respectively. After receiving such a message, a recipient may obtain the sender's full profile from the remote database, exchange messages and appoint a date without disclosing their respective phone numbers and other contact information.

7. SMS-messages are used for conveying data, which requires that terminal users should know numbers to which corresponding SMS-messages should be sent, thus complicating the use of this method.

In order to eliminate the above shortcomings, the proposed method does not use a system of abbreviated instructions and a fixed table from a classified index.

Other conventional solutions in the mobile communication field likewise do not also enable a user to enter and search for mobile communication terminal subscriber objects by a totality of individual distinctive features for the purpose of receiving a subscriber's phone number and making a voice call to him/her in a convenient way.

Also, phone network users are frequently in a position where they either do not know or cannot remember the phone number of a needed subscriber; they know, for example, only the first name and the last name of a subscriber, or the name of the subscriber's organization or company.

SUMMARY OF THE INVENTION

This invention is directed to a method for entering and searching for data regarding an object in a remote database, which would enable to speed up searches, decrease volume of transmitted information, reduce load on the processor of a mobile communication terminal and on the telecommunication networks and equipment, thus expanding functional capabilities, improving performance and ensuring voice calls to subscribers for users of mobile communication terminals without the necessity of knowing phone numbers and without storing such numbers in the memory of a mobile communication terminal, i.e., in the organizer.

In order to achieve the above objects, it is proposed to modify the known method of entering and searching for object data in a remote database, which comprises transmitting an object ID containing message from a mobile communication terminal via the network of the Global System for Mobile Communications through a mobile network operator equipment and over the Internet to a server, receiving that object ID containing the message by the server, searching for the object ID in the server database, and, if found, transmitting a message on the location of the object ID to the mobile communication terminal, by installing software, which enables to use a word as the object ID, on a mobile communication terminal and on a server and by using one word characterizing the name/activity of a legal entity/individual as a message containing the object ID.

Then, when searching for the object ID in the server database, the server compares that word with domain names stored in the database, and if domain names are found such that at least a part of the domain name matches that word, transmits to the mobile communication terminal a list of domain names. Then, if the user selects a domain name from the list, the mobile communication terminal forms a message containing the selected domain name and transmits it to the server; the server conducts a complementary search for that domain name and the corresponding phone number of a subscriber; if the subscriber's phone number is found, the server transmits that number to the mobile communication terminal; and, if the user confirms that domain name/subscriber's phone number, on the mobile communication terminal, the software initiates communication with the subscriber's phone number via the Global System for Mobile Communications and a mobile network operator by making a voice call to the subscriber's phone number.

Certain additional embodiments of the method are possible, where:

after a voice call is completed, the software installed on a mobile communication terminal initiates removal of the subscriber's phone number from the list of outgoing calls and from the mobile communication terminal memory;

several subscribers' phone numbers correspond to one domain name in the database, which are for different time intervals in the day or for geographical locations, and the server transmits a subscriber's phone number to a mobile communication terminal, depending on the time when the word is received;

a domain name or an e-mail address is used as the word.

The objective of the invention is to develop a method comprising the possibility of initiating (making) a voice call by the user of a mobile communication terminal with the use of letter-dialing of a name, including a nickname (hereinafter Domain Mobile Name, or DMN) of a needed subscriber (without using a local telephone directory stored in the memory of the communication terminal or that of a SIM card, but prepared with the use of an ordered system for dynamically forming a name index).

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and, together with the description, serve to explain the principles of the invention.

In the drawings.

DESCRIPTION OF THE PREFERRED EMBODIMENT

The system for entering and searching for data on an object in a remote database (FIG. 1) comprises a server 1 such as a computer with installed software or several computers interconnected to form a network, which are connected to the Internet. The server 1 is intended for storing a database where domain names (DMN) and subscribers' phone numbers are correlated. The server 1 processes requests coming from a user's mobile communication terminal 2 for searching DMN names, sends search results and receives requests for voice calls.

Figure 1:
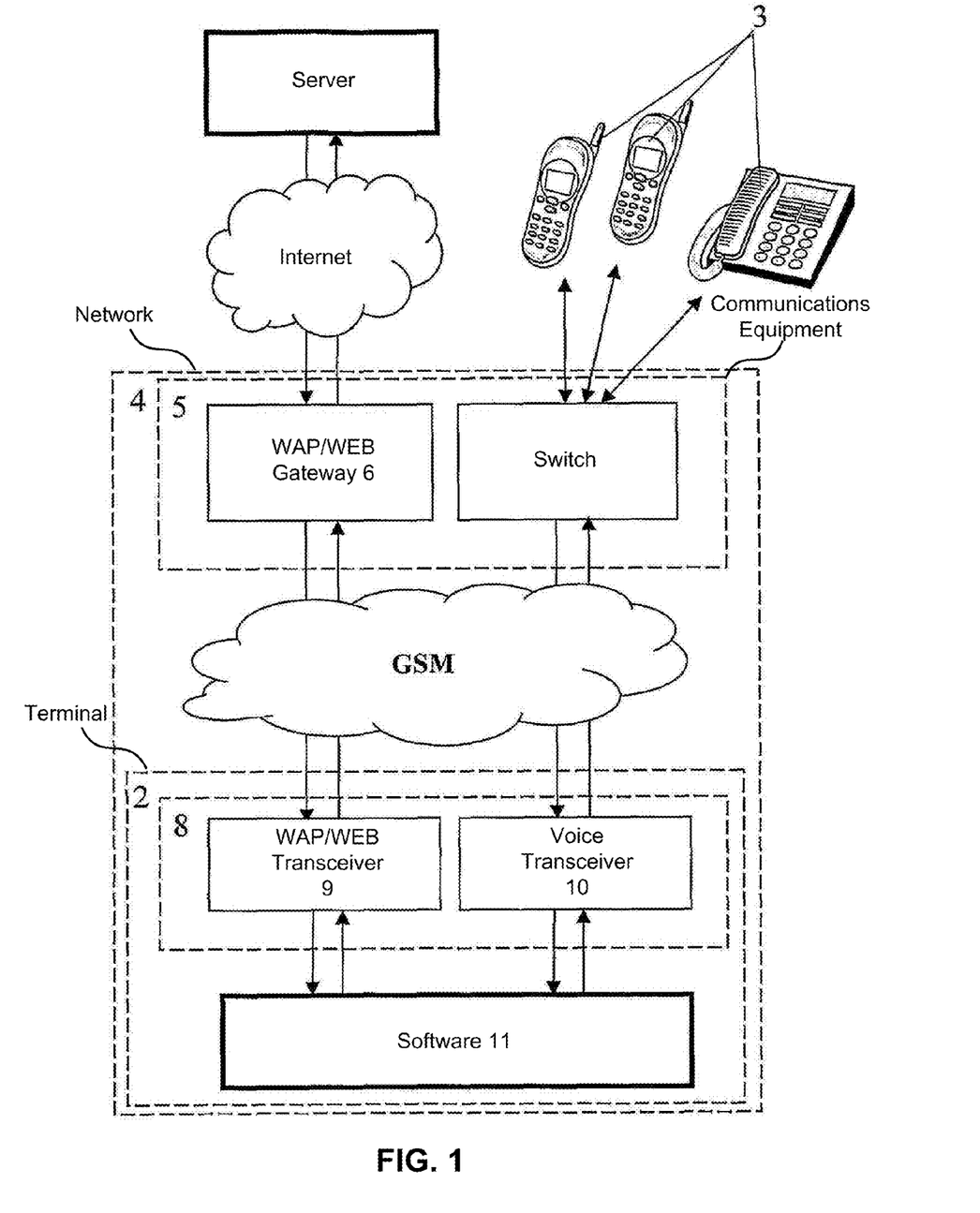
FIG. 1 shows a general functional arrangement of the system for implementing the proposed method.

The server 1 also has software enabling the registration of DMN names and storage of phone numbers corresponding to DMN names of various subscribers and their communication terminals 3.

The method makes use of a standard network 4 of a communications operator. The network 4 of a communications operator includes a plurality of hardware and software units; the arrangement shown in FIG. 1 illustrates only standard units that are directly used within the context of this discussion, namely, those forming equipment 5 of a mobile operator and the mobile communication terminal 2 sending a request.

The equipment 5 comprises a WAP/WEB gateway 6, whose function is to support two-way communication between the mobile communication terminal 2 and the Internet, and a communication switch 7, which supports standard voice calls between communication terminals 3 (mobile or stationary) and the mobile communication terminal 2.

Figure 4:
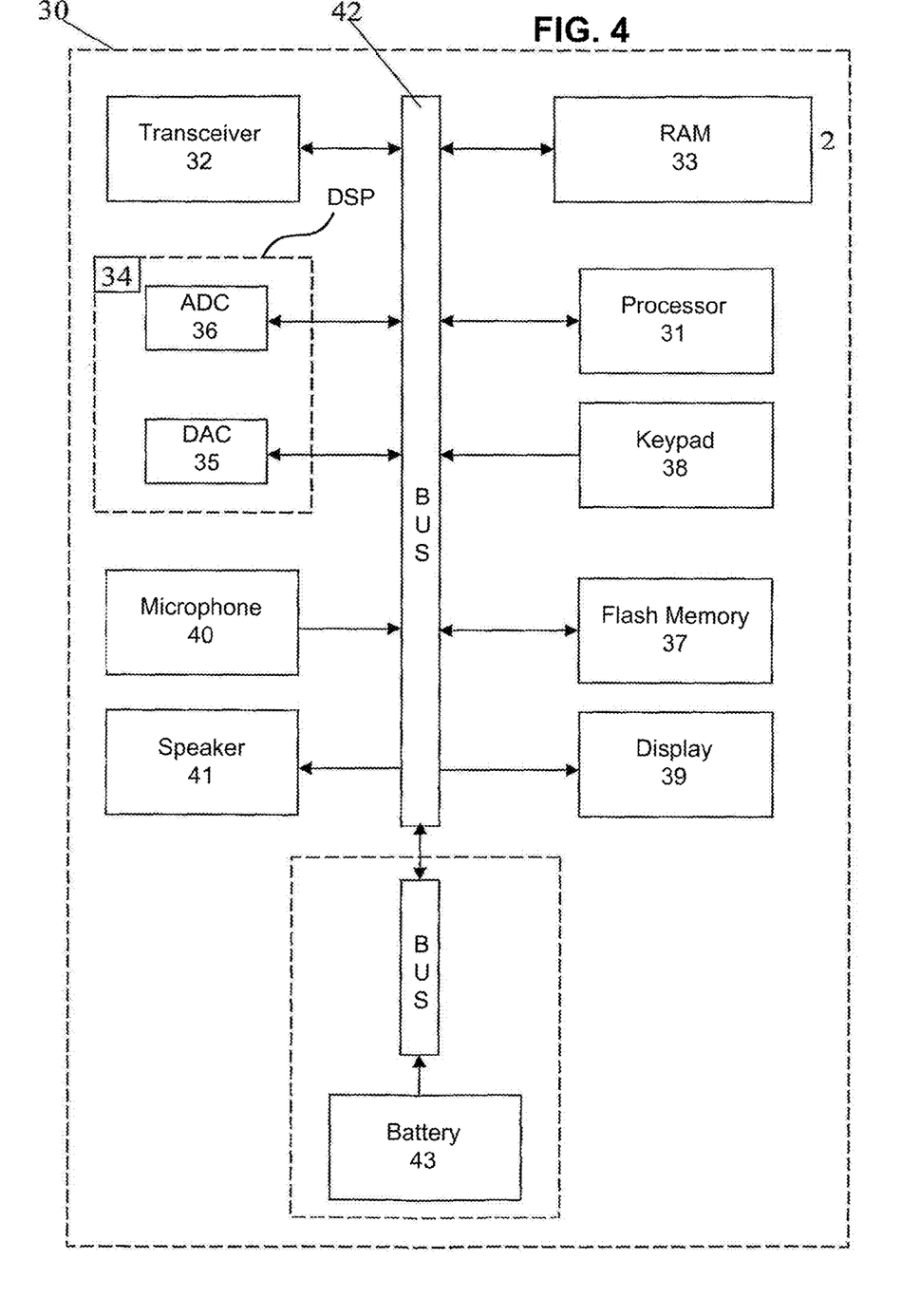
FIG. 4 shows a functional arrangement of a mobile communication terminal.

The mobile communication terminal 2 comprises a hardware unit 8 having a WAP/WEB transceiver 9, a voice transceiver 10, and a unit 11 for software of the mobile communication terminal 2 designed for implementing the method of entering and searching for data on an object in a remote database. The hardware unit 8 is a part of the mobile communication terminal 2. Its detailed functional structure is shown in FIG. 4.

The WAP/WEB gateway 6 of the equipment 5 ensures communication between the WAP/WEB transceiver 9 of the hardware unit 8 and the server 1. The WEB/WAP transceiver 9 and a voice transceiver 10 are the transceivers of the mobile communication terminal 2 used for sending data to the equipment 5 of a communications operator, for example via a GSM network (Groupe Special Mobile, later renamed as the Global System for Mobile Communications, a standard for mobile digital communications). The WEB/WAP transceiver 9 transmits data to the global Internet network (by using the equipment 5 of a communications operator and a GSM network), and the voice transceiver 10 transmits voice data to the equipment 5 of a communications operator through a GSM network.

For the purpose of achieving the stated technical effect, the method of entering and searching for data on an object in a remote database includes:

loading software 11 for implementing the method on a mobile communication terminal to a flash memory device of the mobile communication terminal 2. Such software may be installed on the mobile communication terminal 2 from the Internet with the use of the equipment 5 of an operator of mobile communications and a GSM network, or from a computer (to which it may be also downloaded from the Internet or from a CD) through an IR port of a mobile phone, through a Bluetooth connection or a data cable, or it may be installed directly from one mobile communication terminal to another one through an IR-port or a Bluetooth connection;

loading software implementing the method on a server to the remote server 1;

remotely registering domain names through the Internet network in the DMN names database and sets of corresponding phone numbers owned by subscribers' to the communication terminals 3 in the server 1;

receiving/transmitting standard specialized data packages through communication channels between the mobile communication terminal 2 and the server 1 via a GSM network, the equipment 5 of a mobile operator and the Internet;

displaying actual menu items and necessary data in accordance with data received from the server 1 on the monitor of the mobile communication terminal by using its software unit 11;

initiating a voice call under a domain name selected by the user from the mobile communication terminal 2 to a phone number of a subscriber to the communication terminal 3.

The operating procedure according to one embodiment of the claimed method is as follows.

The user of the mobile communication terminal 2, while using any of the above-described available methods, stores in the memory and installs the software 11 enabling to enter and search for data on an object in a remote database on the flash memory of the mobile communication terminal.

After the software is started by the user, the menu item is formed on the display of the mobile communication terminal 2, which enables the user to enter, by using the mobile terminal keypad, a word that is the name (a sequence of letters and symbols) of the subscribers' to whom the user would like to connect via the mobile communication terminal, but whose phone number is unknown to him.

After the word is entered, the user of the mobile communication terminal 2 confirms that the entry is complete by pressing the key, to which the "Call" function is assigned by the software, on the mobile terminal keypad.

In order to send the entered word, the mobile terminal user confirms initiation of GPRS (General Packet Radio Service) connection with the equipment 5 of the communications operator by pressing the key, to which the "YES" function is assigned by the software, on the mobile terminal keypad. If connection is already established, confirmation of GPRS connection initiation is not shown on the display of the mobile communication terminal 2.

If the "YES" function is selected by a standard function of the mobile communication terminal 2, a GPRS channel is used for connection with the equipment 5 of a communications operator via a GSM network for the purposes of logging on the mobile communication terminal 2 to the global Internet network and connecting the mobile communication terminal 2 to the server 1.

The server 1 receives the word sent to it from the equipment 5 via the Internet network and analyzes it by using the pre-installed software.

When analyzing a word, the server 1 first checks whether it is a DMN name (the proper syntax of a DMN name will be described below).

a. If a request is not a DMN name, then the server 1 searches the database for any DMN names containing the word. If even one DMN name is found, which comprises the word or which composition includes the word, then the server 1, by using the software, prepares a list of all DMN names found and sends the list via the Internet network, the equipment 5 of the communications operator and the GSM network to the mobile communication terminal that has initiated the request.

b. If no DMN names comprising the word from the request are found, then the server 1 sends a message, such as "No DMN name is found at the request; please, change the request text and repeat the search", via the Internet, the equipment 5 of the communications operator and the GSM network to the mobile communication terminal 2 that has initiated the request.

c. If a request is a DMN name, the server 1 searches the DMN name database for a phone number of the subscriber to whom this DMN name is assigned. The server 1 conducts a search for a phone number according to the algorithm described below. If a DMN name is found, which fully coincides with the word in the request, then the server 1, by using its software, sends the subscriber's phone number corresponding to the DMN name at that time.

d. If no DMN name is found that coincides with the word in the request, then the server 1 sends a message, such as, e.g., "The entered DMN name is not registered; please, change the request text and repeat the search", via the Internet network, the equipment 5 of the communications operator and the GSM network to the mobile communication terminal 2 that has initiated the request.

If the mobile communication terminal 2, which has initiated a request to the server 1, receives the reply "a" from the latter via the Internet network, the equipment 5 of the communications operator and the GSM network, then the software of the mobile communication terminal 2 shows, with the use of the display and the menu, the received list of DNS names on the mobile terminal display and asks the user of the mobile communication terminal 2 to select a DNS name from the list or enter a word for a new request by using the keypad and send it to the server 1 by pressing the key, to which the "Call" function is assigned by the software. After the user of the mobile communication terminal 2 selects one of the DNS names shown on the display and presses the key, to which the "Call" function is assigned by the software on the keypad, the mobile communication terminal 2 sends a request consisting of the DMN name selected by the user from the list shown on the display of the mobile communication terminal 2 to the server 1 via the GSM network, the equipment 5 of the operator and the Internet network.

If the mobile communication terminal 2, which has initiated a request to the server 1, received the reply "b" from the latter, then the mobile communication terminal 2, by using the software 11, shows on the display of the mobile communication terminal 2 a text message, e.g., "No DMN name is found for this request; please, change the text in the request and repeat the search", and gives to the user a possibility of entering a word for a new request and sending it to the server 1 by pressing the key, to which the "Call" function is assigned by the software, on the keypad of the mobile communication terminal 2.

If the mobile communication terminal 2, which has initiated a request to the server 1, receives the reply "c" from the latter, then a text message, e.g., "Make a call to the found subscriber?", appears on the display of the mobile communication terminal. The user of the mobile communication terminal 2 is given the possibility of confirming a call by pressing the key, to which the "Call" function is assigned by the software, on the keypad of the mobile communication terminal 2. After the call initiation is confirmed, the mobile communication terminal initiates a voice call to the subscriber's terminal 3, which number has been received from the server 1 in reply to the request, via the GSM network and the equipment 5 of the operator (this process is described in more detail below). The called subscriber may be a subscriber in any communication network, whether mobile or stationary. The voice call may be terminated either by the user of the mobile communication terminal, who presses the key, to which the "Stop" function is assigned by the software, on the keypad, or by the equipment 5 of the communications operator due to a communication failure or call termination on the side of the called subscriber. When a voice call is terminated, the software of the mobile communication terminal 2 removes, through the processor, the last called subscriber's number from the mobile terminal RAM.

If the mobile communication terminal 2, which has initiated a request to the server 1, received the reply "d" from the latter, then the mobile communication terminal 2, by using the software 11, shows on the display of the mobile communication terminal 2 a text message, e.g., "The requested DMN name is not registered; please, change the text in the request and repeat the search". The user is given a possibility of entering a word for a new request and sending it to the server 1 by pressing the key, to which the "Call" function is assigned by the software, on the keypad of the mobile communication terminal 2.

When the software, which enables to enter and search for data on an object in a remote database, completes its work, the user of a mobile communication terminal resumes using the standard dialing mode for subscribers' numbers.

Figure 2:
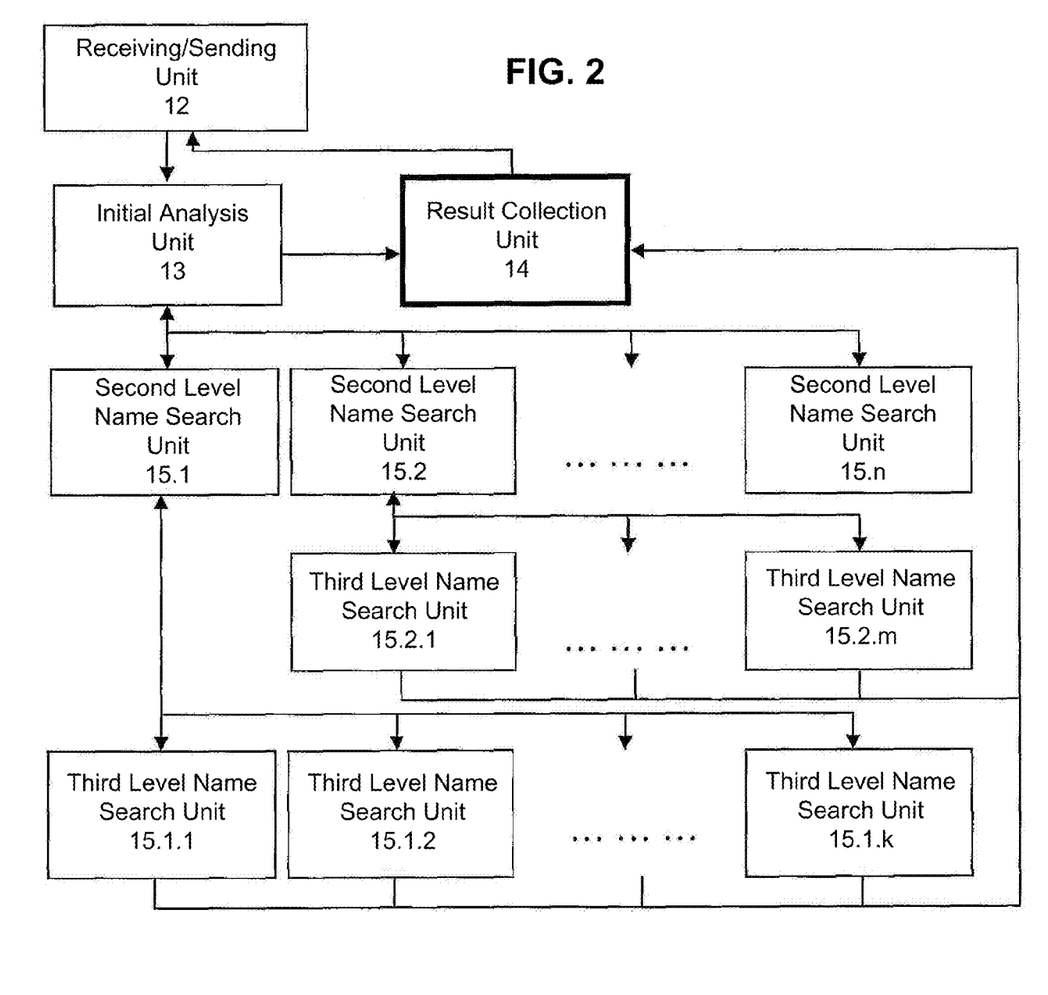
FIG. 2 shows a functional arrangement of the server.

The server 1 works as follows (FIG. 2).

The unit 12, being the unit for receiving/sending, receives a word sent to the server 1 from the mobile communication terminal 2 for searching for DMN names and transmits it to the unit 13 for initial analysis.

The receiving/sending unit 12 assigns a unique numeric identifier (e.g., 1230994372), which is also transmitted to the unit 13 for initial analysis. Thereafter, in the process of searching for data, the request and its unique numeric identifier are maintained together. This is done so that the unit 12 can exactly determine to which mobile communication terminal 2 search results should be sent after they are received by the receiving/sending unit 12 from the result collection unit 14 in respect of the search word sent.

Any incoming request is analyzed in the unit 13. A request is checked for correct syntax of the DMN name.

The correct syntax of a DMN name should be:

"name of N-level" "." "name of N−1-level" "." . . . "." "name of 2nd level" "." "name of 1st level", where N is a natural number;

"name"—a part of a DMN description, which is separated from the other part of DMN by dot.

For example: "spartakfk.moscow.ru", where:

"ru"—name of 1st level,

"moscow"—name of 2nd level,

"spartakfk"—name of 3rd level.

This example will be used in the description of the other units.

If during the text check in the initial analysis unit 13 it is found that the text of the word in the request does not correspond to the correct syntax for a DMN name, then the request word is transmitted by the initial analysis unit 13 to the input "A" of the result collection unit 14.

The unit 14 has a list of all DMN names in the database for DMN names of the server 1. If data to the unit comes via the input "A" from the unit 13, then the unit 14 searches for all DMN names comprising at least a part of the request word, forms a list of all DMN names found and transmits it to the receiving/sending unit 12 for further transmitting it to the mobile communication terminal 2 that has initiated the request. If no DMN name comprising the request word is found, then the unit 12 sends, instead of a list of DMN names, a text, such as "No DMN name is found at this request, change the request word and repeat the search", for further transmitting it to the mobile communication terminal 2 that has initiated the request.

If, during the text check in the initial analysis unit 13, it is found that the text of the word in the request corresponds to the correct syntax for a DMN name, then the initial analysis unit 13 analyzes which of the units 15.X for searching for names of the 2nd level (where X is the number of registered names of the 1st level) has information on the name of the first level (in the above example it is the name "ru") and transmits data on the searched DMN name to this unit (supposing that in this example the name "ru" is stored in Unit 15.2).

If the initial analysis unit 13 cannot find a unit 15.X having data on a first-level word, then the request is considered as a request for a search and returned by the initial analysis unit 13 to the result collection unit 14 to the input "A".

The units 15.X (where X is the number of registered names of the first level) for searching names of the 2nd level analyze names of the 2nd level. This unit receives separately a name of the 1st level from the unit 13, which is then compared to the data contained in the unit in order to confirm correctness of transition and the DMN name for further analyzing the name of the 2nd level ("moscow" in this example).

For the above example the unit 15.2 for searching for names of the 2nd level, while analyzing a DMN name, analyzes which of the units 15.2.M (where M is the number of 2nd-level names registered for the name "ru" of the 1st level) for searching for names of the 3rd level has information on the name of the 2nd level ("moscow" in our example) and transmits information of the searched DMN name to this unit. In this example, the unit 15.2.1 has such information).

If the unit 15.2 for searching for names of the 2nd level cannot find the unit 15.2.M having information on the name of the second level, then such a request is considered as a search request and is returned to the initial analysis unit 13 for further transmitting it to the result collection unit 14 to the input "A".

The unit 15.2.1 for searching for 3rd level names in the example carries information on which names of 3rd level are assigned to the DMN name "moscow.ru", and which phone numbers correspond to those DMN names at any particular time. This unit contains information that the subscriber's number +7495XXXXXXX (or several numbers) corresponds to the DMN name "spartakfk.moscow.ru" at this time.

If the unit 15.2.M for searching for 3rd level names cannot find information on a DMN name corresponding to a request, then such a request is considered as a search request and is returned to the unit 15.2 for searching for 2nd level names, which returns the request to the initial analysis unit 13 for further transmitting it to the result collection unit 14 to the input "A".

A subscriber's phone number corresponding to the DMN name is transmitted by the unit 15.2.1 for searching for 3rd level names to the result collection unit 14 to the input "B", to which data for sending is collected from all units participating in a search. The result collection unit 14 transmits gathered information to the receiving/sending unit 12 for further transmitting it to the mobile communication terminal 2, which has initiated the request.

The proposed method differs from the domain name system used in the Internet network in that a domain name is not used for finding a single IP address of a server, and registered domain names are used for finding corresponding phone number(s). Moreover, in contrast to common search systems on the Internet, which enable finding websites containing a given word and visiting such websites, the claimed method analyzes the location of a domain name corresponding at least to a part of the word, rather than that of the word itself. For example, for "spartakfk.moscow.ru" a user may be given the following names from a list: "sparta.moscow.ru", "spart.moscow.ru", "spar.moscow.ru", "sp.moscow.ru", etc., if no correct domain name is found in the database. When sending the word "spartak" to the server 1, a user may be given a complete list of words containing the name "spartak", both legal entities and individuals, such as: "spartakfk.moscow.ru", "spartakoff.moscow.ru", "spartakiada.moscow.ru", etc.

It may be noted that the method may be used not only as a search method, and if a user knows the exact name of a domain name or an e-mail address, this may be used directly for calling that subscriber. In that case, a search for the number of the called subscriber's mobile communication terminal 3 is performed in the database of the server 1, and the connection between the initial analysis unit 13 and the result collection unit 14 is not used.

Thus, if the user of the mobile communication terminal 2 enters, for example, the word "spartak" for a search, then, depending on domain names registered in the database of the server 1, he may receive a complete list of domain names relating to different levels, e.g.:

"spartakfk.moscow.ru"
"spartakbk.omsk.ru"
"spartak.golfclub.ru"
"spartak.continent.fr"
"spartakoff.fummitur.us"
etc.

If the user confirms his selection of one domain name from the list at the mobile communication terminal, a connection to the subscriber's phone number will be initiated and a voice call will be made, as above.

A user, without knowing a particular subscriber's phone number, may connect to various organizations, e.g., government authorities, shops, medical clinics, enterprises, etc., which are registered at the server 1. A user may be also connected to individuals, and for this he should enter at his mobile communication terminal the following words "konstantin.petrovich.ivanov". If Konstantin Petrovich Ivanov is registered at the server 1 as a subscriber, then the user may make a voice call to him. If several subscribers with matching first and last names are registered at the server, then an additional tag, such as occupation, age, etc., may be introduced into a domain name. The sender of such a message may be given a list of domain names "konstantin.petrovich.ivanov-doctor", "konstantin.petrovich.ivanov-18age", etc. Thus, in order to conduct a search it will be sufficient for a user to enter a word or a group of words characterizing the name or activity of a legal entity or an individual.

Due to the fact that the claimed method is applicable in practically any geographic territory where a mobile network operator is available, an additional unit (not shown in FIG. 2, may be included in the initial analysis unit 13) for analyzing an approximate location and a time of a request from the user of a mobile communication terminal may be included for the purpose of giving actual numbers of searched subscribers to the users of mobile communication terminals 2.

Two different users of the mobile communication terminal 2, presenting one and the same request, e.g., "Toyota.ru" at one and the same time, for example at 12:00 Moscow time, will be given different subscribers' phone numbers in Moscow and in Vladivostok. The subscriber to the mobile communication terminal 2 in Moscow will receive the number of the terminal 3 of the Toyota representative office in Moscow. The subscriber to the mobile communication terminal 2 in Vladivostok will receive the phone number of the terminal 3 of the automatic Call-center of the Toyota representative office in Vladivostok, because it will be 4:00 AM in Vladivostok.

The request time is determined by the fact of receiving a request by the system, and an approximate location of the subscriber to the terminal 3 is determined by an IP-address of the terminal 3, which is assigned to the latter by the mobile network operator.

Furthermore, the database of the server 1 may store several phone numbers for one domain name. For example, if a user has connected to a shop at 12:00, i.e., during business hours, the phone number of the store's sales department will be given to him, but if it is 1:00 AM, then the phone number of the store's security service or the answering machine will be given to him. And, if making a voice call to a subscriber's phone number when it is busy, the server 1 may propose to make a voice call to another phone number of that domain name.

Thus, the database of the server 1 may have several subscriber's phone numbers for different time intervals of the day or for geographic locations, and the server 1 will transmit a subscriber's phone number to the mobile communication terminal 2, depending on the time of the received message, i.e., a word.

Figure 3:
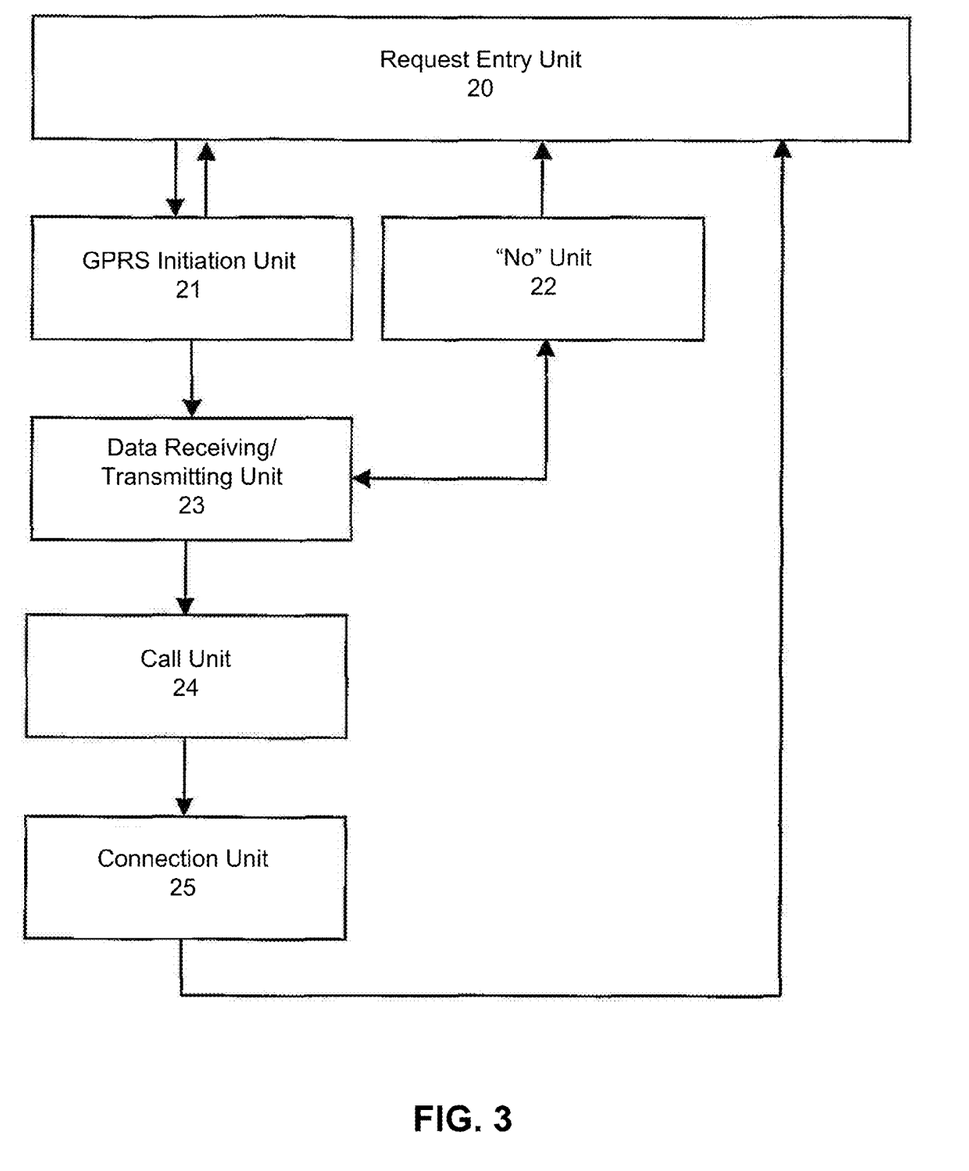
FIG. 3 shows a block diagram of the software for a mobile communication terminal.

The control over the mobile communication terminal 2, which is performed by the software 11 (FIG. 1) enabling to enter letter designation of a subscriber, is exercised according to the following algorithm (FIG. 3).

After starting the software 11 (FIG. 1), the control over the mobile communication terminal 2 is transferred to the request entering unit 20 (FIG. 3).

The request entering unit 20 proposes to the user of the mobile communication terminal 2 through the menu on the display to enter a request word by using the keypad. After the request word is entered, the user of the mobile communication terminal 2 confirms the end of entering by pressing the key on the keypad, to which the "Call" function is assigned by the software, and then the control over the mobile communication terminal 2 is transferred to the GPRS initiation unit 21.

The GPRS initiation unit 21 checks whether the mobile communication terminal 2 has established the connection to the equipment 5 of the mobile operator. If the GPRS connection is already established, then the control over the mobile communication terminal 2 is transferred to the unit 23 for data receiving/transmitting from/to the server 1.

If the GPRS connection is not established, a menu text, which states the necessity of confirming initiation of the GPRS connection to the equipment 5 of the mobile operator, is shown on the display of the mobile communication terminal 2. The user of the mobile communication terminal 2 confirms initiation of the GPRS connection to the equipment 5 of the mobile operator by pressing the key on the keypad, to which the "YES" function is assigned by the software 11, otherwise the control over the mobile communication terminal 2 is returned to the unit 20.

The data receiving/transmitting unit 23 (transceiver), using the GPRS connection between the mobile communication terminal 2 and the equipment 5 of the mobile operator sends the request word via the GSM network to the server 1 for an analysis and waits for a reply from the server 1.

When a reply to the request is received from the server 1 via the Internet network, the equipment 5 of the operator and the GSM network, the unit 23 checks whether the reply to the request is a subscriber's phone number. If the reply is not a subscriber's phone number, then the control over the mobile communication terminal 2 is transferred to the "No" unit 22, otherwise the control over the mobile communication terminal 2 is transferred to the "Call" unit 24.

If the "No" unit 22 is in operation, the message received from the server 1 will be shown on the display of the mobile communication terminal 2 through the menu. If a text message is received, it is shown on the display of the mobile communication terminal 2, and pressing any key on the keypad transfers the control over the mobile communication terminal 2 to the request entering unit 20. If a received message is in the form of a list, then the list is shown on the display of the mobile communication terminal 2, and the user of the mobile communication terminal 2 is given the possibility of selecting any DMN name from the list with the use of the keypad. If the user of the mobile communication terminal 2 selects one of the DMN names by pressing the key on the keypad, to which the "Call" function is assigned by the software, the "No" unit 22 will transfer the control over the mobile communication terminal 2 to the unit 23 and will write the DMN name selected by the mobile communication terminal 2 into the request text for subsequent sending it by the transceiver unit 23 to the server 1.

When the unit 24 is in operation, a voice call will be made to the subscriber having the phone number received from the server 1. The call will be made by the standard means of the mobile communication terminal 2 through transmitting the called subscriber's phone number to the equipment 5 of the mobile network operator via a GSM network, initiating connection to the subscriber by the equipment 5 of the mobile network operator, and connecting to the subscriber's terminal via the switch 7 of the equipment 5 and the GSM network (FIG. 1). During conversation the user of the mobile communication terminal 2 uses its standard functions. After conversation is finished, the control over the mobile communication terminal 2 will be transferred to the correction unit 25.

Due to the fact that a standard function in most mobile communication terminals 2 is creating a list of the last ten subscribers called, the software 11 of the mobile communication terminal 2, when the correction unit 25 is used, removes, by using the processor, the last dialed subscriber's number from the random-access memory (RAM) unit. This removal is carried out in order to comply with the privacy rights of individuals not to disclose confidential information about themselves, a phone number being such information. Then, control over the mobile communication terminal 2 is again transferred to the request entering unit 20.

The mobile communication terminal 2 needed for implementing the claimed method is not practically changed (FIG. 4), only the software 11 should be installed in the flash memory unit.

The mobile communication terminal 2 (FIG. 4) comprises a housing 30, a processor 31, installed within the housing 30, a transceiver 32, random-access memory (RAM) unit 33, a signal processing unit 34 made with a digital-to-analog converter (DAC) 35 and an analog-to-digital converter (ADC) 36, a flash-memory unit 37 intended for loading software and files, a keypad 38, a display 39, a microphone 40 and a speaker 41, all installed within the housing 30, the input/output of the transceiver 32, the input/output of the random-access memory unit 33, the input/output of the analog-to-digital converter 36, the input/output of the digital-to-analog converter 35, the input/output of the flash-memory unit 37, the output of the keypad 38 and the input of the display 39 are connected to the processor 31 through a bus 42, the output of the microphone 40 is connected to the analog-to-digital converter 36 through the bus 42, the input of the speaker 41 is connected to the digital-to-analog converter 35 through the bus 42, and the software is made with the possibility of controlling the processor 31, the display 39 and the speaker 41 through the keypad 38 and the menu on the display 39, the software being made with the possibility of entering a word with the use of the keypad 38 and is intended for searching for data on an object in a remote database. FIG. 4 also shows a battery 43 connected to the bus 42.

The mobile communication terminal (FIG. 4) works as follows.

A high-frequency transceiver 32 is, for example, a first-class transmitter-receiver of the mobile communication terminal 2, which transmits and receives radio signals. The processor 31 controls operation of the functional units of the mobile communication terminal 2 according to the instructions stored as software in the flash-memory unit 37. The keypad 38 enables the user to control the mobile communication terminal 2, as described above, by moving along the embedded menu and initiating execution of some or other commands. The display 39 may show commands and action variants available to the user.

The flash-memory unit 37 is used for downloading the software 11 made with the possibility of controlling the operation of the processor 32, the RAM unit 34 (for transmitting search results thereto) and the display 39 of the mobile communication terminal.

The software 11 may be a multiplatform Java application or a program application in another format, which is suitable for the operation software 11 used at a given mobile communication terminal 2 and adapted for a particular model of the mobile communication terminal 2.

As noted earlier, software may be downloaded through the unit for plugging in computer peripheral devices or through other means. The user may be required to perform additional actions for installing and setting up the software 11. After installation, a link to the installed software 11 appears in the general menu of the applications installed on the mobile communication terminal 2.

The user's actions on sending and receiving corresponding messages for the purpose of implementing the claimed method have been described in sufficient detail earlier.

The claimed invention enables the user of the mobile communication terminal 2 to initiate a phone call to another communication terminal 3, to a subscriber, whom he wishes to communicate to without knowing his phone number, but having only information on the form of the organization or on the name, including a nickname, of an individual, which are arranged with the use of an ordered system for dynamically forming a classified domain name index stored at the server 1.

The method provides for the alphabetic dialing of the subscriber's name, rather than the numeric one. Note that the call may be anonymous in both directions—neither party will know the phone number of the other party, or may be anonymous only in the sense that the caller will not know the recipient's number, but the recipient of the call will know the caller's number. As yet a further option, the initiator of the call knows the recipient's phone number, but the recipient does not know the phone number of the initiator of the call.

As yet a further option, the user's telephone/mobile terminal can maintain a history of searches, and the user, when doing a new search, can look through the history and select the same search that has already been performed. Also, upon finding any DTN name, the user can add the DTN name to the list of his contacts in the mobile terminal, so that in the future, he can perform the call directly without performing any further searches. Also, an additional version of the search can be performed based on words or text description specified by the owner of the DTN name.

Additionally, when the first message/search request is sent to the server, the server can also supply a matching advertisement to the user's mobile terminal, for example, in the form of a text ad, a banner, a video clip, etc., while the server is searching for the DTN name. The advertisement can be displayed while the server is searching for the DTN name, or for a specified time period. The advertisements can also be saved on the mobile terminal, and displayed again, in conjunction with the appropriate search request, when the user makes the same request again. The advertisement can be associated with a DTN name and with a phone number (either displayed in the ad, or not displayed), so that the user can call the number in the advertisement (for example, to purchase the advertised product) by, e.g., clicking on the ad on a touchscreen.

INDUSTRIAL APPLICABILITY

The claimed method for entering and searching for data on an object in a remote database may be most successfully used in GSM mobile communication systems.

Having thus described a preferred embodiment, it should be apparent to those skilled in the art that certain advantages of the described method and apparatus have been achieved. It should also be appreciated that various modifications, adaptations and alternative embodiments thereof may be made within the scope and spirit of the present invention. The invention is further defined by the following claims.

What is claimed is:

1. A method for inputting and searching information about an object in a remote database, comprising:
    transmitting a first message containing an object ID from a mobile communication terminal via a Global System for Mobile Communications (GSM) network through a mobile network operator equipment and further transmitting the first message over the Internet, and using an Internet-compatible protocol, to a server, wherein at least one word characterizing a name of an individual or an organization is included in the object ID;
    receiving the first message at the server;
    searching for the object ID in a server database;
    at the server, comparing the at least one word with domain names stored in the database and, if domain names are found such that at least a part of the domain name matches the at least one word, transmitting to the mobile communication terminal a list of domain names, the domain names including URI's/URLs;
    if the object ID is found, transmitting a second message regarding a selection of the object ID to the mobile communication terminal;
    upon the user selecting a domain name from the list transmitting a third message containing the selected domain name to the server;
    at the server, performing a second search for the selected domain name and the corresponding phone number of a subscriber associated with the selected domain name;
    if the subscriber's phone number is found, transmitting the subscriber's phone number to the mobile communication terminal; and
    upon confirmation of selection of the domain name/subscriber's phone number, initiating a voice call to the subscriber's phone number via the GSM network.

2. The method of claim 1, wherein, after the voice call is completed, software installed on a mobile communication terminal removes the subscriber's phone number from the mobile communication terminal memory.

3. The method of claim 1, wherein multiple subscribers' phone numbers correspond to a single domain name in the database, with different phone numbers corresponding to different time intervals of the day, different days of the week or different geographical locations, and wherein the server transmits a selected subscriber's phone number to the user's mobile communication terminal, depending on the time when the first or second message is received.

4. The method of claim 1, wherein, if the at least one word matches a single domain name or a single e-mail address, the selecting step and the second search are omitted and the user is connected to the subscriber via the voice call.

5. A method for searching information about an object in a remote database and anonymous connection of network subscribers, the method comprising:
    from a mobile communication terminal, transmitting, via a mobile telephone network, a first message containing an object ID and further transmitting the first message over the Internet, and using an Internet-compatible protocol, to a server, wherein the object ID includes at least one word associated with an individual;
    receiving the first message at the server;
    searching for the object ID in a server database;
    at the server, comparing the at least one word with domain names stored in the database, the domain names including URI's/URLs, and, if domain names an found such that at least a part of the domain name matches the at least one word, transmitting to the mobile communication terminal a list of domain names, the domain names including URI's/URLs;
    if the object ID is found, transmitting a second message regarding a selection of the object ID to the mobile communication terminal;
    upon the user selecting a domain name from the list, transmitting a third message containing the selected domain name to the server;
    at the server, performing a second search for the selected domain name and the corresponding phone number of a subscriber associated with the selected domain name;
    if the subscriber's phone number is found, transmitting the subscriber's phone number to the mobile communication terminal; and
    upon a user confirming selection of the domain name/subscriber's phone number on his mobile communication terminal, initiating a voice call to the subscriber's phone number via the mobile telephone network.

6. The method of claim 5, further comprising, after to voice call is completed, removing the subscriber's phone number from the mobile communication terminal memory.

7. The method of claim 5, wherein multiple subscribers' phone numbers correspond to a single domain name in the database, with different phone numbers corresponding to different time intervals of the day, different days of the week or different geographical locations, and wherein the server transmits a selected subscriber's phone number to the user's mobile communication terminal, depending on the time when the first or second message is received.

8. The method of claim 5, wherein, if the at least one word matches a single domain name or a single e-mail address, the selecting step and the second search are omitted and the user is connected to the subscriber via the voice call.

* * * * *